UNITED STATES PATENT OFFICE.

JERVIS R. HARBECK, OF DETROIT, MICHIGAN, ASSIGNOR, BY MESNE ASSIGNMENTS, TO DETROIT CAN COMPANY, OF DETROIT, MICHIGAN, A CORPORATION OF NEW JERSEY.

PROCESS FOR FORMING A VAPOR-PROOF MATERIAL.

1,027,727.     Specification of Letters Patent.     Patented May 28, 1912.

No Drawing.     Application filed October 15, 1908. Serial No. 457,861.

*To all whom it may concern:*

Be it known that I, JERVIS R. HARBECK, a citizen of the United States, and residing at Detroit, in the county of Wayne and State of Michigan, have invented a new and useful Process for Forming a Vapor-Proof Material, of which the following is a specification.

My invention relates to the manufacture of containers from paper, straw-board and other fibrous material, and its object is to provide a container that shall be impervious to vapors and gases.

It has been possible for some time to manufacture containers of fibrous materials which are adapted for shipping and storing liquids, but trouble has been experienced in the production at a reasonable cost of a container which will prevent even the minutest portion of these liquids from evaporating or which would be adapted for the shipment or storage of materials which are affected by minute amounts of vapors and gases from the surrounding atmosphere.

Ordinarily, glues and other cements while in liquid form contain large quantities of water or other solvents that evaporate as the glue hardens. The spaces occupied by these solvents and the passages through which their vapors escape permit the vapors of the liquid contents of the containers to pass through and surrounding gases and vapors to penetrate. Under ordinary conditions this is immaterial but containers for the shipment and storage of baking powder, gun powder, borax, dehydrated vegetables and many other substances must be absolutely vapor proof. To render the walls of containers impervious to vapors and gases it is necessary to fill the small capillary canals or passages mentioned above, and this may be accomplished in a number of different ways of which several are as follows: Into the hot glue or other cement employed to unite the different thicknesses of tube material a fusible substance, preferably in the form of powder is stirred, which fusible substance has a higher melting point than the temperature of the hot cement. The cement is applied to the fibrous material in any desired manner and the material wound up into a tube and allowed to dry. After the solvent of the cement has thoroughly evaporated the tube is heated to a temperature sufficient to melt the fusible substance which thereupon fills the canals and small passages that have been left open by the evaporating solvents. After cooling, the container is impervious to vapors. These fusible materials may be copal and dammar or other fossil gums, resins, sulfur, shellac, rubber or combinations of the same, but any other may be employed. About one part of good glue, one part of powdered dammar gum, and two parts of water by weight form a good proportion of materials.

Another manner of preparing the containers is to introduce into the hot liquid cement a fusible material which is insoluble by the solvent of the cement but which has a lower melting point than the cement, and will therefore remain in suspension in the cement after it itself has been melted. The bodies are formed in the usual manner and after the solvent has evaporated the tubes are heated to melt the fusible material, which as before stated, fills up the capillary passages. It will be seen that any of the substances mentioned before may be employed with cement that works best at a high temperature or stearine may be used with ordinary glue.

Another manner for forming impervious container bodies is to coat the material with cement, and before the thicknesses are placed in contact, to dust a layer of fusible powder over the cement. After the body is formed the solvent of the cement is permitted to evaporate and the body is heated to melt the fusible material as before stated.

Still another manner of forming these container bodies is to coat one side of the fibrous material with the fusible substance. The same side or the other side of the sheet is coated with the cement, the material is formed into a container body, the solvent is allowed to evaporate and then the body is heated to melt the fusible substance. In coating the fibrous sheets with this fusible substance the coating may be either in the form of a solution, the substance may be held in suspension in a liquid which will leave the substance deposited upon or attached to the fibrous material, or the substance may be fused and applied hot.

Another very desirable manner of forming impervious containers is to incorporate one of the fusible substances mentioned before in the body of the sheet while the fibrous material is being formed. The container bodies are formed in the usual manner and after the solvent has evaporated the container body is heated to melt the fusible material, which as before stated, will fill the capillary passages in the fibrous material. Or the container may be formed by folding or bending the sheet and fastening it together to form the well known forms of paper pails for oysters and ice cream. The sheet may be heated before or after the container is formed therefrom.

Another manner of forming these tubes and container-bodies is to dissolve a fusible substance, such as the varnish gums, in a proper solvent to form the cement. After the solvent has evaporated, the body is heated to such a temperature that the fusible material will melt and fill up the capillary passages left by the solvent.

An extensive series of tests have shown that absolutely impervious container bodies can be formed in the different manners described above and it will be noted that in each case a fusible substance is melted after the solvent of the cement has evaporated, to fill up the minute passages through which the evaporated solvent has escaped.

Caps for the containers may be formed of several thicknesses held together by a cement as above explained and be secured in place before the container body is heated, but ordinarily only one such head is advisable. The other is preferably made of tin and secured to the body in any well known manner.

Having now explained my improvements, what I claim as my invention and desire to secure by Letters Patent is:—

1. The process of manufacturing a multiply fabric consisting in cementing plies of fabric together with a liquid cement embodying a volatile solvent and a fusible material, evaporating the volatile solvent and then heating to fuse the fusible material so that it shall fill the pores in the fabric through which the volatile solvent has escaped.

2. The process of manufacturing a multiply fabric consisting in cementing plies of fibrous material together by a liquid cement embodying a fusible gum and a volatile solvent, evaporating the volatile solvent and then heating to fuse the gum so that it shall fill the pores in the fibrous material through which the volatile solvent has escaped.

3. The process of manufacturing a multiply fabric, consisting in cementing plies together with a compound consisting of a cement, a volatile solvent for the same, and a fusible material, evaporating the solvent, and then heating the fabric to fuse the fusible material between the plies so that it shall fill the pores in the fabric through which the solvent has escaped.

In testimony whereof, I have signed this specification in the presence of two subscribing witnesses.

JERVIS R. HARBECK.

Witnesses:
H. W. WHITE, Jr.,
V. C. SNYDER.